UNITED STATES PATENT OFFICE.

CHARLES F. SMITH, OF HILLSBOROUGH, ASSIGNOR TO HIMSELF AND HENRY C. SMITH, OF MILFORD, NEW HAMPSHIRE.

IMPROVEMENT IN COMPOSITIONS FOR RENOVATING AND INVIGORATING APPLE-TREES.

Specification forming part of Letters Patent No. 132,543, dated October 29, 1872.

*To all whom it may concern:*

Be it known that I, CHARLES F. SMITH, of Hillsborough, in the county of Hillsborough, State of New Hampshire, have invented a certain Composition and Process for Exterminating Borers and Renovating and Invigorating Apple-Trees, of which the following is a specification:

Take, in bulk, two-thirds of pulverized blue vitriol, one-sixth of white chalk, and one-sixth iron scales, and mix thoroughly in a mortar.

Apply the above composition by boring a hole in the tree as near the roots as possible, for a small tree using a one-fourth-inch bit, and for larger trees a larger bit or auger. Bore to the center of the tree and fill the hole with the composition above described. The composition will be dissolved by the sap gradually and carried through the tree; and the effect will be to entirely exterminate borers and invigorate and renovate the tree and improve the quality and flavor of the fruit.

I claim as my invention—

The composition above described and the process of applying the same to apple and other trees, to exterminate the borers and invigorate the tree.

CHAS. F. SMITH.

Witnesses:
   CHAS. C. LUND,
   CARROLL HUTCHINS.